(12) United States Patent
Rajan et al.

(10) Patent No.: US 6,325,360 B1
(45) Date of Patent: *Dec. 4, 2001

(54) STRUCTURED PACKING ASSEMBLY

(75) Inventors: Varagur S. V. Rajan, Sherwood Park; Karl Tze-Tang Chuang; Douglas Alexander Lillico, both of Edmonton, all of (CA)

(73) Assignees: Alberta Research Council Inc.; The Governors of the University of Alberta, both of Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/428,995

(22) Filed: Oct. 28, 1999

Related U.S. Application Data

(63) Continuation-in-part of application No. 09/244,208, filed on Feb. 4, 1999, now Pat. No. 5,975,503.

(30) Foreign Application Priority Data

Dec. 23, 1998 (CA) .................................................. 2257128

(51) Int. Cl.⁷ ...................................................... B01F 3/04
(52) U.S. Cl. ................ 261/112.1; 261/113; 261/DIG. 72
(58) Field of Search ............................. 261/94, 95, 108, 261/112.1, 113, DIG. 72

(56) References Cited

U.S. PATENT DOCUMENTS

| | | |
|---|---|---|
| 1,561,044 | 11/1925 | Alexander . |
| 2,042,127 | 5/1936 | Sayles ................................ 261/112.1 |
| 4,276,242 * | 6/1981 | Chen et al. .......................... 261/113 |
| 4,296,050 | 10/1981 | Meier ................................ 261/112.2 |
| 4,337,217 | 6/1982 | Braun ................................ 261/112 |
| 4,676,934 | 6/1987 | Seah .................................. 261/112.2 |
| 4,842,778 | 6/1989 | Chen et al. ............................. 261/97 |
| 4,929,399 | 5/1990 | Lockett et al. .................... 261/112.2 |
| 4,981,621 | 1/1991 | Pluss ................................. 261/112.2 |
| 5,057,250 | 10/1991 | Chen et al. ........................ 263/112.2 |
| 5,063,000 | 11/1991 | Mix .................................. 261/94 |
| 5,080,836 | 1/1992 | Chen et al. ........................ 261/112.2 |
| 5,132,056 | 7/1992 | Lockett et al. .................... 261/112.2 |
| 5,185,106 | 2/1993 | Chen et al. ........................ 261/112.2 |
| 5,188,773 | 2/1993 | Chen et al. ........................ 261/112.2 |
| 5,407,607 | 4/1995 | Mix .................................. 261/112.2 |
| 5,413,741 | 5/1995 | Buchholz et al. ................. 261/112.2 |
| 5,441,793 | 8/1995 | Süess ................................ 428/192 |
| 5,458,817 * | 10/1995 | Lang ................................. 261/94 |
| 5,500,160 | 3/1996 | Süess ................................ 261/79.2 |
| 5,578,254 | 11/1996 | Mix .................................. 261/112.2 |
| 5,624,733 | 4/1997 | McKeigue et al. .................. 428/182 |
| 5,637,263 | 6/1997 | Lang et al. ........................ 261/94 |
| 5,644,932 | 7/1997 | Dunbobbin et al. ................ 062/640 |
| 5,653,126 | 8/1997 | Harada et al. ..................... 062/643 |
| 5,975,503 * | 11/1999 | Chuang et al. ..................... 261/113 |

FOREIGN PATENT DOCUMENTS

| | | | |
|---|---|---|---|
| 1292424 | 11/1991 | (CA) . | |
| 1327306 | 3/1994 | (CA) . | |
| 294281 * | 4/1981 | (DE) ............................ 261/DIG. 72 |
| 29 42 481 A1 | 4/1981 | (DE) . | |
| 1402883 * | 8/1975 | (GB) ............................ 261/DIG. 72 |
| 814419 * | 3/1981 | (SU) ............................... 216/108 |
| 1291191 * | 2/1987 | (SU) ............................ 261/DIG. 72 |
| 1409315 * | 7/1988 | (SU) ............................ 261/DIG. 72 |
| 1685503 * | 10/1991 | (SU) ............................ 261/DIG. 72 |

OTHER PUBLICATIONS

International Search Report Feb. 24, 2000 PCT/CA99/01179.

* cited by examiner

*Primary Examiner*—C. Scott Bushey
(74) *Attorney, Agent, or Firm*—Rodman & Rodman

(57) ABSTRACT

Structured packing for mass-exchange or energy-exchange processes uses a stack of parallel, flat sheets forming flat channels therebetween. A number of tabs extends between adjacent pairs of sheets to form both bridges for fluid flow and spacers for structural rigidity of the packing. Some of the tabs serve predominantly to divert fluid over the entire surface of a given sheet to prevent so-called channeling, while other tabs are disposed to predominantly enhance fluid transfer between the adjacent sheets. Fluid communication between both sides of each sheet is facilitated due to slots caused by the punching of the tabs. Preferably, the tabs or even entire sheets are perforated as well to facilitate fluid wetting of downward-faced portions of the tabs thus reducing "dry zones" on the packing.

10 Claims, 5 Drawing Sheets

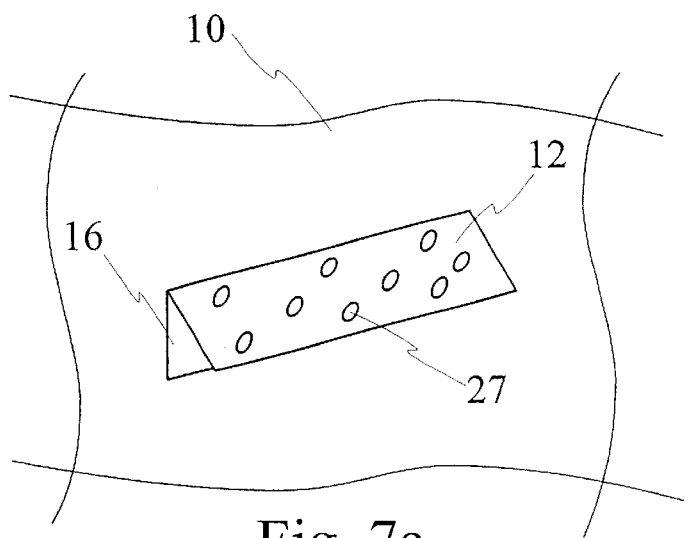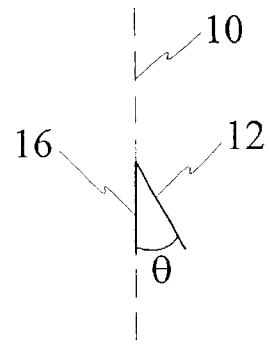
Fig. 7a                Fig. 7b
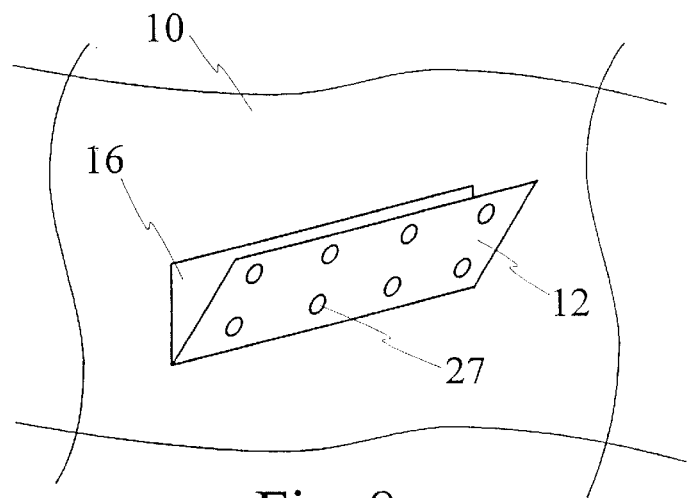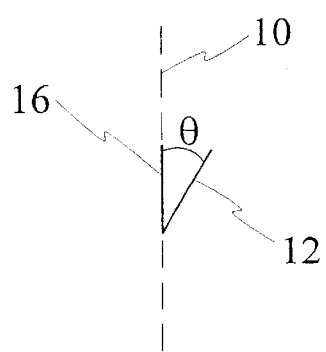
Fig. 8a                Fig. 8b
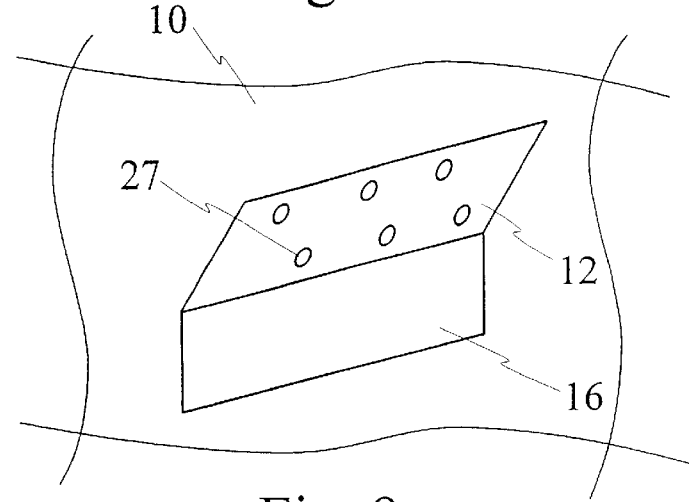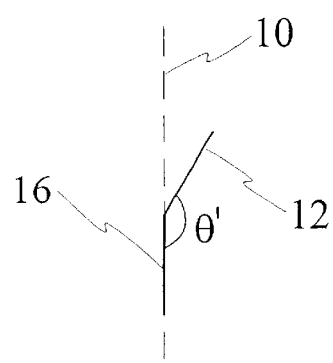
Fig. 9a                Fig. 9b

STRUCTURED PACKING ASSEMBLY

This invention is a continuation-in-part of U.S patent application Ser. No. 09/244,208 filed Feb. 4, 1999, now U.S. Pat. No. 5,975,503. This application claims priority from earlier filed U.S. patent application Ser. No. 09/244,208 filed Feb. 4, 1999, now U.S. Pat. No. 5,975,503, and Canadian patent application number 2,257,128 filed Dec. 23, 1998.

FIELD OF THE INVENTION

The invention relates to a structured packing for producing intimate contact of fluids, for example liquid—liquid, liquid-gas, or gas—gas, particularly in a mass and/or heat exchange apparatus. More particularly, the invention relates to a structured packing assembly for enhancing contact between a first fluid having a predominantly downward direction of flow, and a second fluid, the packing having a plurality of juxtaposed sheets.

BACKGROUND OF THE INVENTION

Structured packings in general have a well-defined geometry of discrete flow channels facilitating theoretical estimation of the performance of the transfer device. Structured packings of various designs have been known in the chemical industry for decades. They are generally known to offer a lower resistance to flow than bulk (random) packing, and lend themselves to easy installation within a mass exchange chamber. Structured packing elements may be constructed of corrugated of fluted plates, such as known e.g., from U.S. Pat. Nos. 4,929,399 to Lockett et al.; 5,407,607 to Mix; 5,188,773 to Chen et al; 5,624,733 to McKeigue et al. and 5,132,056 to Lockett et al.

In most of the prior art solutions, the corrugations, folds or flutings are arranged at an angle to the vertical, or the axis of the column or tower. This has the effect of non-uniform distribution of the liquid flow over the surface of the packing plates.

U.S. Pat. No. 2,042,127 to Sayles describes a structured packing assembly composed of a number of generally vertically disposed, parallel, generally flat sheets arranged in superimposed tiers. The assembly features collectors disposed at the top of a tier for distribution of down-flowing liquid over both sides of the subjacent plates. It is noted that Sayles advocates the sheets being disposed as close as possible to prevent cascading, or free-fall of liquid through the packing.

U.S. Pat. No. 1,561,044 to Alexander proposes a structured packing assembly also composed of a number of parallel flat sheets having projections extending all between adjacent sheets perpendicularly to the sheets and serving as spacers therebetween.

While the parallel-sheet concept of Sayles and Alexander is useful, there is still a need in the mass/energy transfer industry for a simple, low weight (low material cost) and large surface area (high efficiency interphase transfer) structured packing with a relatively low pressure drop. It is also important that vapour and liquid be able to transfer between sheets so that uniform liquid and vapour distribution over the column or tower cross-section be maintained. The uniform distribution of fluids is essential for achieving high efficiency of mass transfer. The ease of assembly and placement in the exchange apparatus (e.g., a tower) as well as the structural quality of the packing are also of importance. Additional desired features of a structured packing are good wetting of the sheet surface by the fluid(s), or minimization of so-called "dry zones" in the assembly, and improved cross-flow between adjacent flow channels.

SUMMARY OF THE INVENTION

In accordance with the invention, there is provided a packing assembly for enhancing contact of a first fluid and a second fluid passing therethrough, the first fluid usually having a generally downward direction of flow when passing through said assembly, the packing assembly comprising:

a plurality of juxtaposed generally flat sheets disposed generally parallel to each other to form generally flat channels for the flow of the fluids therethrough, a plurality of projections protruding from said sheets and arranged in said channels, wherein said projections comprise at least one fluid-spreading projection and a plurality of sheet-spacing projections, the at least one fluid-spreading projection extending angularly from one sheet towards an adjacent sheet preferably without contacting the adjacent sheet. The projections are preferably punched out of the sheets without cut-out losses. The fluid-spreading projection may extend upwardly or downwardly, at an acute angle or an obtuse angle relative to the surface of the respective sheet, and specifically relative to the original position of the projection before punching and bending.

The spacing projections extend between adjacent sheets in a bridging relationship at a generally right angle to the planes of the respective sheets. The general symmetry line of the spacing projections is preferably at an angle to the horizontal to minimize hold-up or entrapment of the first fluid on the spacing projections. The angle to the horizontal can be selected in a broad range, from a few degrees to almost 90°.

Preferably, the contact between the spacing projections and the adjacent sheets is by abutment only. A permanent attachment is feasible but not preferable for ease of construction, especially if multiple spacers are involved.

Since the spacing and spreading projections, called hereinafter also tabs, extend away from the flat, vertical surfaces of the sheets, their down-turned surfaces may not be wetted properly in operation by the downward flowing liquid. Dry zones on those surfaces may result. In order to minimize the occurrence of such dry zones, the packing assembly may comprise means for enhancing contact of at least the first, downward flowing fluid with the down-turned surfaces of the packing assembly that would normally give rise, in operation, to "dry zones" of the assembly. The means may be embodied by a plurality of perforations in the spacing and spreading projections, and/or by a specific design of the projections themselves e.g., by their appropriate bending. Also, perforations (or weep holes) may be provided in at least some of the flat portions of the sheets to provide fluid communication between both sides of the sheets. The perforations may be of a size allowing liquid flow ("weep holes"), while others may be of a size allowing both liquid and gas flow therethrough. The perforations on the projections (tabs) or entire sheets enhance the uniformity of distribution of down-flowing liquid between two sides of a sheet and reduce the occurrence of a dry, non-wetted zone on the downward-facing part of a tab that does not come in direct contact with the down-flowing liquid. Additionally, a perforated assembly is obviously lighter than an analogous non-perforated one. The number of perforations and their size are such as not to compromise substantially the mechanical strength of the sheets and of the assembly.

The perforations should not be equated with slots that remain from the punching of the tabs out of the sheets.

Preferably, the projections are formed as integral part of the sheets and are disposed in a regular arrangement over the surface of said sheets such as to promote uniform distribution of at least one of the fluids passing through the assembly over the surface of the sheet.

BRIEF DESCRIPTION OF THE DRAWINGS

The invention will be explained in more detail by way of the following description in conjunction with the accompanying drawings in which:

FIG. 7a is a perspective view of a perforated spreader projection (spreader tab), FIG. 7b is a side view of the projection of FIG. 7a, FIG. 8a is a perspective view of another perforated spreader projection, FIG. 8b is a side view of the projection of FIG. 8a, FIG. 9a is a perspective view of still another perforated spreader projection, FIG. 9b is a side view of the projection of FIG. 9a, FIG. 10a is a perspective view of yet another perforated spreader projection, FIG. 11b is a side view of the projection of FIG. 11a.

DETAILED DESCRIPTION OF THE INVENTION

Figure 1:
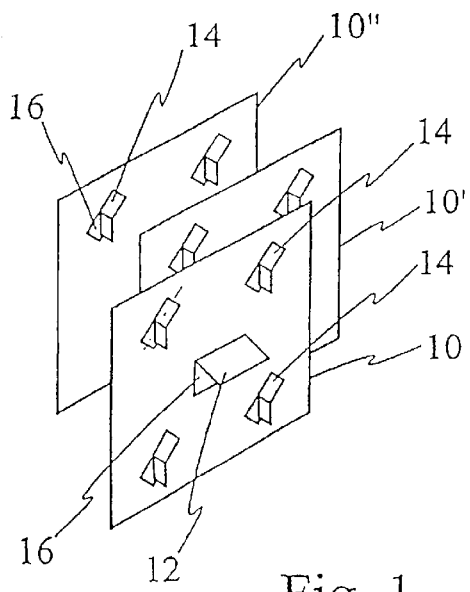
FIG. 1 is a perspective exploded view of the packing assembly of the invention.

In a basic embodiment of the structured packing assembly of the invention, the assembly is constructed of several flat sheets 10, 10', 10'', each sheet having at least a central spreader tab 12 and typically four spacer tabs 14. Both types of tabs are provided by punching out parts of the sheets without cut-aways. The punched-out tabs 12 and 14 define slots 16. Each two adjacent sheets define a fluid flow channel therebetween.

Figure 3:
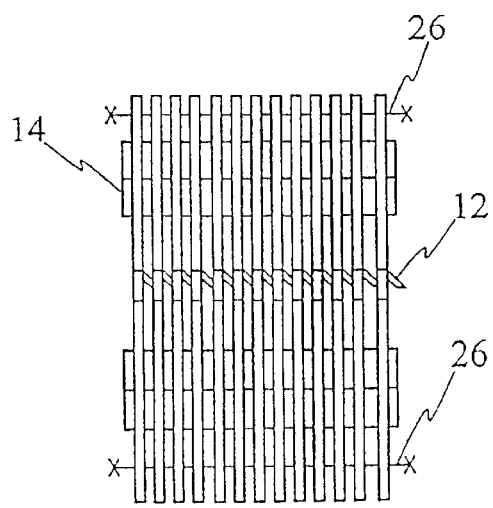
FIG. 3 represents a side view of the assembly.

While all the tabs in the embodiments illustrated herein are bent in one direction, it is understood that some of the tabs may be bent in the opposite direction than others as long as a proper spacing between sheets and a relative stiffness of the assembly are maintained. The central spreader tab 12 on each sheet is of a quadrilateral, e.g., rectangular or trapezoidal shape. It is preferable that the outer edge 22 of the tab 12 be essentially parallel to the respective sheet 10 such that, in assembled packing, the outer edge 22 is close to the adjacent sheet with its entire length to facilitate the transfer of descending fluid between the sheets by creating a wider "bridge" between the respective sheets. The spreader tab 12 is preferably cut out horizontally (perpendicularly to the direction of flow of the descending fluid) and projecting from the plane of the sheet 10 at an angle θ of about 45° relative to the plane of the sheet, as best seen in FIG. 3, so that some of the fluid flowing downward over the surface of the sheet 10 will be deflected over the surface of the tab 12 onto the surface of the adjacent sheet. This feature is designed to distribute the flow of at least the descending fluid between the sheets. The height of the slot and the angle of protrusion of the spreader tab is such that the tab is confined to a width lesser than the gap between the sheets controlled by the spacer tabs 14.

Figure 4:
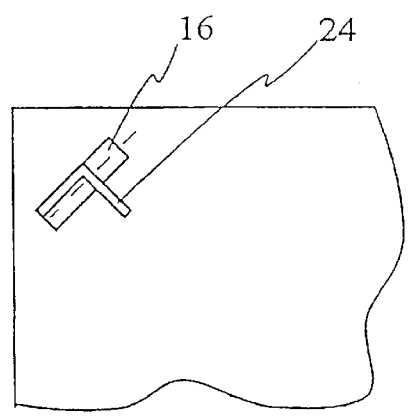
FIG. 4 is a partial front view of a single sheet of an alternative embodiment of the packing assembly.

Turning now to the spacer tabs 14, the major axes of these tabs, indicated in dotted lines in FIGS. 1 and 4, are disposed diagonally relative to the vertical and to the downward direction of flow of the first fluid, and folded out of the plane of the sheet 10 at about a straight angle. In the embodiment illustrated in FIG. 2, the tabs 14 are also partly bent at an angle β, about 120°, to control the lateral spread of the descending fluid. The slots 16 of spacer tabs 14 are disposed at an angle α, typically about 45° to the horizontal (see FIGS. 6a–6f).

The size of each tab 14 is selected such that, in the assembled packing, at least some of the tabs 14, in addition to their above-described purpose, also bridge adjacent sheets 10, 10' and act as spacers. The tabs 14 basically serve to spread the descending fluid sidewise over the surface of the same sheet to enhance uniform distribution of fluid over the entire surface of the sheets. Practically, the tabs 14 will likely also function to allow passage of the fluids between adjacent sheets while the tabs 12 will likely function partially to distribute the fluid flow laterally, over the surface of the same sheet. In other words, while the tabs are intended to separate (but mutually complementary) purposes, viz. 1) transfer of fluids between sheets and 2) relatively uniform distribution of fluids over the surface of each sheet, they will likely perform, to a degree, both functions.

Figure 2:
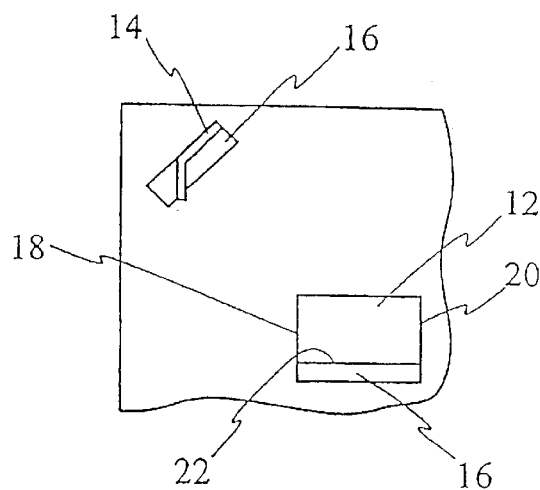
FIG. 2 is a partial front view of a single sheet of the packing assembly.

It will be noted that the tabs 14 in the embodiment illustrated in FIG. 2 are inclined in only one direction and partly bent to expose a part of the slot 16 which is formed by punching out the tab 14. The thus exposed part of the slot, or opening, 16 facilitates a transfer of both fluids from one side of the respective sheet onto another.

It is feasible to provide the spreader tabs 14 of a different shape, i.e., as illustrated in FIG. 4, wherein the spreader tabs 24 are bent to form a symmetrical semi-triangular outline. Such a shape would have the effect of spreading the descending fluid uniformly on both sides of the tab 24. It should be noted that the corrugated sheets of the prior art assembled with the flow channels at an angle of 30–45° to the vertical direction. As a result, the entire gas flow upward changes direction as the gas passes from one channel to the one above it in the next staggered layer. This causes higher pressure drop than that for the flat sheet packing of the present invention. The pressure drop over the flat sheets will increase somewhat with the presence of the tabs. However, this increase will be small because the tabs obstruct only a small fraction of the flow area deflecting a small portion of the total gas flow, and the deflection angle can be selected to minimize the pressure drop. Generally, the size, shape and orientation of the tabs can be designed to meet fluid distribution and pressure drop requirements.

It will be seen in FIG. 3 that the sheets are maintained in the parallel arrangement by both tabs 14 acting as spacers. It is feasible to provide a greater plurality of tabs 12 and 14 and arrange for only some tabs 14 to extend from one sheet to another while the remaining tabs 14 also serve to deflect the flow of descending fluid laterally but do not abut the opposite sheet. This provision may be applied to control the flow resistance, or pressure drop, of the fluids. The spacer tabs also provide strength or mechanical rigidity to the sheet assembly. Consequently, the sheets can be of relatively small thickness compared with conventional structures, resulting in a lower weight and reduced material use of the structured packing.

Referring again to FIG. 1, it will be noted that the juxtaposed sheets 10 are disposed in a staggered arrangement of their respective tabs 12 and 14. The reason for such an arrangement will become clear once it is realized that in a mass-production, all the sheets will be manufactured with an identical pattern of the tabs 12, 14 and corresponding slot 16. During assembly, the tabs of one sheet would tend to fall into the corresponding openings of the adjacent sheet unless an amount of lateral shift, or stagger, were applied. The orderly arrangement of the tabs ensures uniform distribution of the fluids over the sheets.

Turning now to FIGS. 5, 7a, 8a, 9a, 10a and 11a, it will be seen that the tabs, both spacer tabs 14 and spreader tabs 12, have small perforations 27 to facilitate flow of descending fluid onto the downside part of the tabs 12, 14. This has the effect of alleviating the occurrence of "dry zones" on the underside of these tabs and as a result, increased mass transfer capacity of the assembly. The perforations have a small diameter, several times smaller than the width of the tabs, typically 2 mm to 10 mm (0.08 to 0.4 in.), to enable the provision of several perforations on each tab.

Figure 10A:
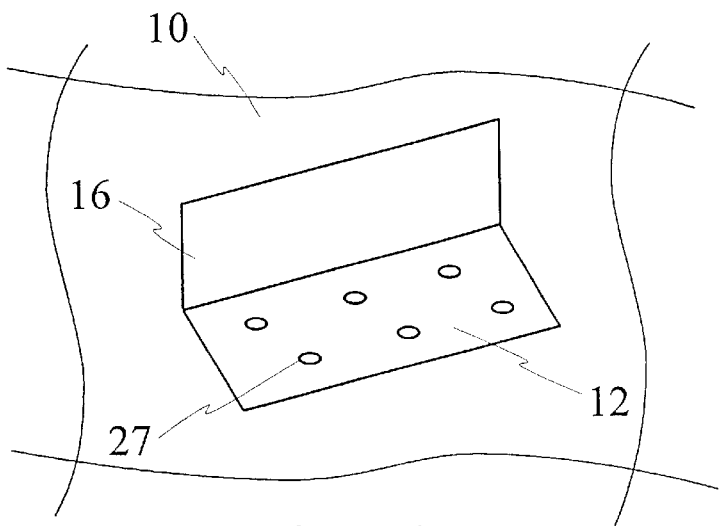
FIG. 10b is a side view of the projection of FIG. 10a, FIG. 11a is a perspective view of a split spreader projection.
Figure 10B:
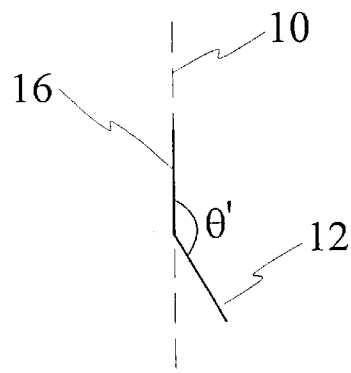

While some spreader tabs, as shown in FIGS. 1, 2, 3, 7a, are bent downwards at an acute angle to their original position in the sheet before punching out (which is shown schematically in FIG. 7b as an angle $\theta$ between elements 12 and 16), other configurations are also feasible and offer certain advantages. The tabs can extend downwardly at an obtuse angle as shown in FIG. 10a and 10b, or upwardly at an acute angle as shown in FIG. 8a and 8b. As shown in FIG. 9a and 9b, the spreader tab can be bent upwardly at an obtuse angle $\theta'$ to its original, pre-punching position. As a result, the respective slot 16 (FIG. 9a) becomes exposed to a lateral flow of fluid therethrough. This has the effect of facilitating the flow of descending fluid from one side of the sheet onto the other side compared with the design of FIGS. 1 and 2, and facilitating cross-flow between adjacent fluid flow channels. Another likely effect of this arrangement is a further improvement of wetting of the surface of the sheets, or, in other words, a prevention of dry zones.

Figure 11A:
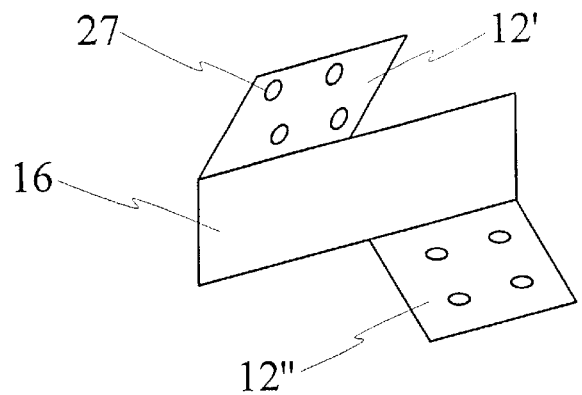
Figure 11B:
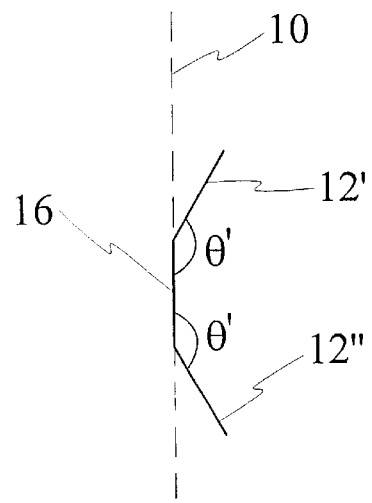

FIG. 11b shows an alternative design of a spreader tab according to the invention. It is formed from a single slot 16 but split into two parts, 12' and 12" which are bend upwards and downwards respectively, each one at an obtuse angle $\theta'$ relative to the slot 16 (see FIG. 11b), or in other words, away from the slot. The split spreader tab may be bent towards either on the same side or opposite sides of a sheet. This provision, particularly combined with the perforations 27, is aimed at a further improvement of the distribution of flow of descending fluid over the surfaces of the respective sheet, and an enhancement of cross-flow between adjacent flow channels formed between the sheets.

Figure 6A:
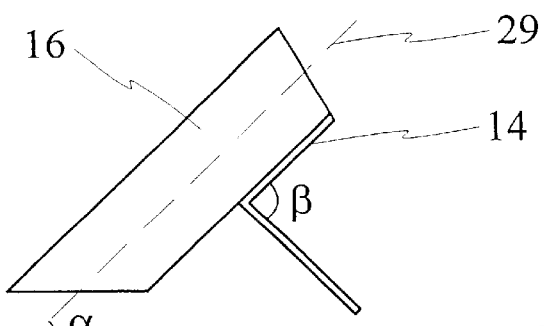
FIGS. 6a, 6b, 6c, 6d, 6e and 6f illustrate various alternative configurations of spacer projections (tabs)
Figure 6B:
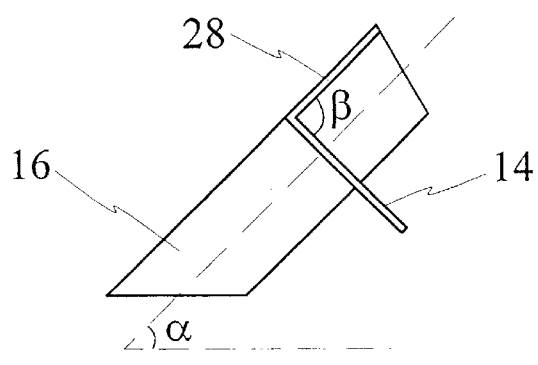
Figure 6C:
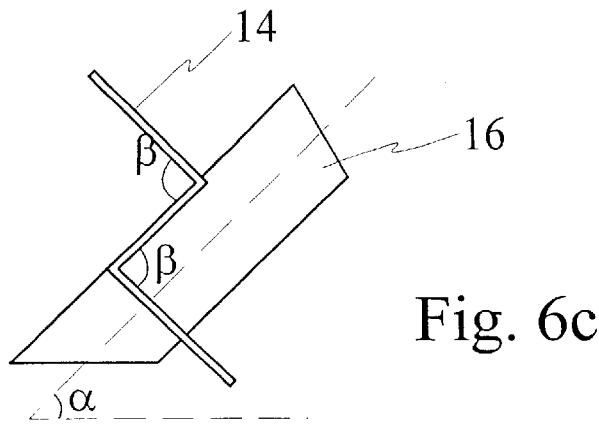
Figure 6D:
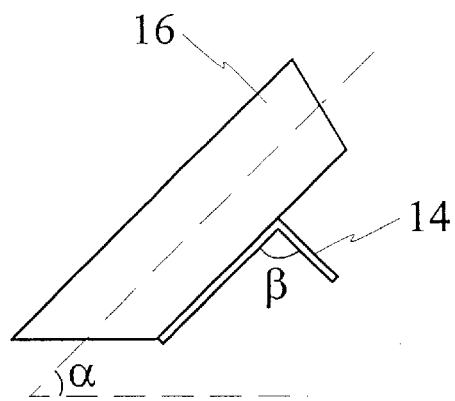
Figure 6E:
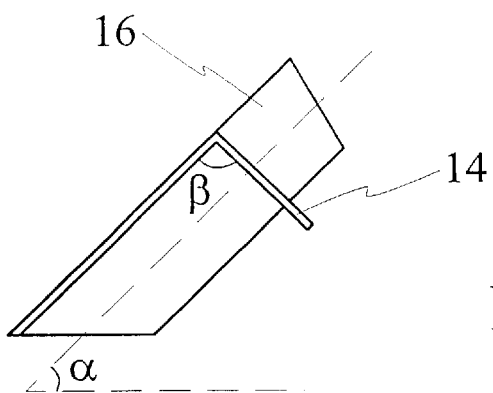
Figure 6F:
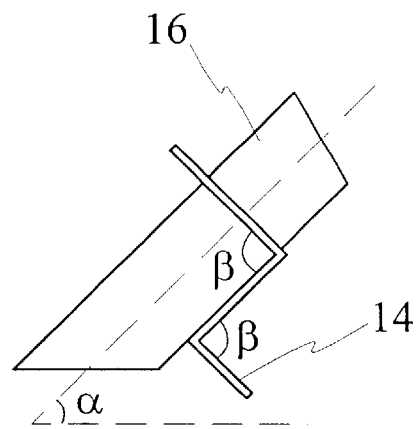

FIGS. 6a–6f illustrate various alternative designs of spacer tabs 14. As mentioned hereinabove, the main axis of the tabs 14, shown with a dotted line 29, is inclined to the horizontal at an angle $\alpha$ which can vary from a few degrees to almost 90° to avoid fluid entrapment. The tabs extend at a right angle, or normal, to the surface of the sheets to prevent their collapse under pressure and thus afford stiffness and rigidity of the assembly. The tabs are also bent into at least two segments, e.g., two (FIG. 6a) or three (FIGS. 6c and 6f). The segments can be bent at various angles $\beta$ to the main axis 29 (and the main segment 28) of the tab to control the distribution of the descending fluid. The tab can be bent from the lower edge of the slot (FIG. 6a, 6d, 6f) or from the upper edge of the slot (FIG. 1, 2, 4, 6b, 6c, 6e). The former design exposes the associated slot to a lateral flow of fluids therethrough and thus facilitates the flow of fluids between both sides of the respective sheet, or, as explained above, cross-flow between adjacent flow channels.

It will also be noted that the bent segments of the tab 14 can be bent (at the angle $\beta$) either across the associated slot, as seen in FIG. 2, 6b or 6e, or away from the slot as shown in FIG. 6a and 6d.

Figure 5:
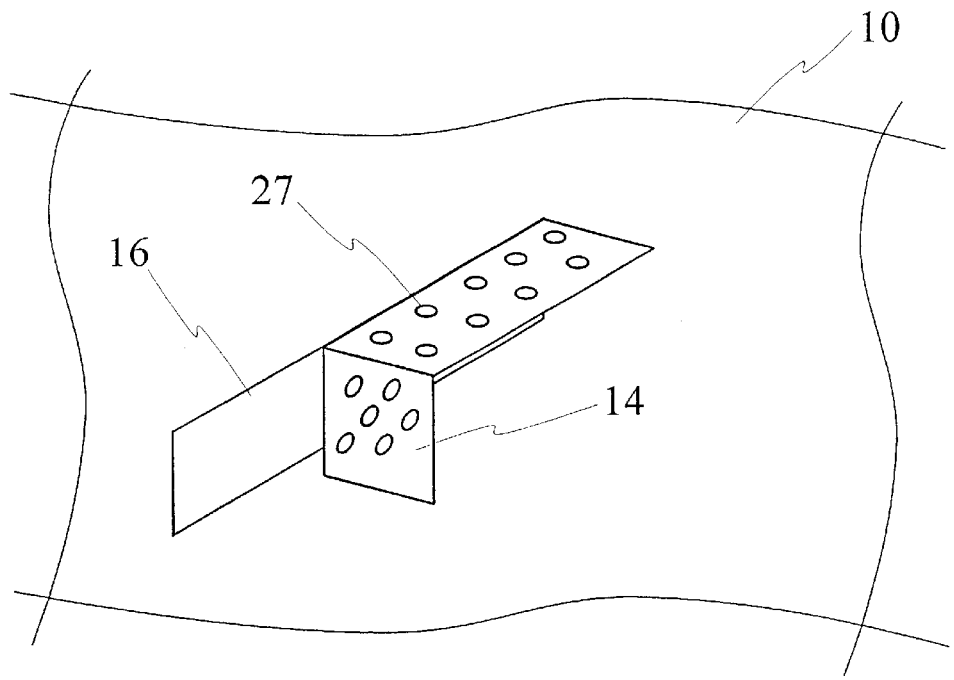
FIG. 5 is a perspective view of a perforated spacer projection (spacer tab)

While not shown in FIGS. 6a–6f, the tabs 14 may also have perforations as shown in FIG. 5.

The assembled packing structure may be maintained in a fixed shape by various conventional means. They may include tie-rods 26 extending through a set of sheets. as shown schematically in FIG. 3, or external straps or frame (not shown) or other known fastening elements. In any case, the assembly does not require means for interlocking the sheets of one tier with the sheets of another (upper or lower) tier for positioning and structural rigidity as in Sayles U.S. Pat. No. 2,042,127. An assembly of the invention may simply be stacked on top of another assembly, turned by 90° to avoid the intercalation of the respective sheets.

The size of the sheets and of the tabs may vary depending on the dimensions of the process apparatus and process conditions. Additional surface treatment of the sheets, e.g., coating, roughness or small weep holes, may be applied to achieve desired performance characteristics.

It is a feature of the invention that the spacing protrusions extending between adjacent sheets function both as bridges creating a flow path of the film of descending liquid between adjacent sheets and as stiffeners enhancing the structural stability of the assembly.

It is another feature of the invention that the perforations in the protrusions and optionally in the entire sheets function to facilitate the flow of fluids between the sides of the sheets and alleviate dry areas on the packing assembly thus enhancing the mass transfer and the efficiency of the packing assembly.

It is an advantage of the invention that the beneficial effect of louvers, perforations/openings and protrusions of the prior art is combined with the simplicity and relatively low pressure drop characteristic of flat sheet structured packing wherein the protrusions perform a double function, i.e., distribution of fluid flow and enhancement of the rigidity of the assembly.

We claim:

1. A structured packing assembly for enhancing contact of a first fluid and a second fluid, said first fluid having a generally downward direction of flow when passing through said packing assembly, the packing assembly comprising a plurality of juxtaposed generally flat sheets disposed generally parallel to each other to form generally flat channels for the flow of said fluids therethrough, and a plurality of projections disposed in each of said channels, said projections comprising at least one fluid-spreading projection and a plurality of spacing projections, the at least one fluid-spreading projection extending angularly from one sheet without contacting an adjacent sheet, the spacing projections extending between adjacent sheets in a bridging relationship at a generally straight angle to the sheets and at an angle to the horizontal to minimize hold-up or entrapment of said first fluid thereby, wherein said structured packing assembly has means for enhancing contact of the first fluid with downside portions of said packing assembly in order to reduce the occurrence of dry zones during operation of the assembly.

2. The assembly of claim 1 wherein said contact enhancing means are perforations in said projections.

3. The assembly according to claim 2 wherein said perforations have an average diameter several times smaller than the width of the respective projection.

4. The assembly according to claim 1 wherein the sheets have perforations in planar portions thereof to facilitate fluid communication between both sides of the sheets.

5. The assembly as defined in claim 1 wherein said contact enhancing means are spreading projections that extend upwardly from their respective sheets.

6. The assembly according to claim 1 wherein at least some of said spreading projections are bent at an obtuse angle relative to their respective sheet in order to expose the associated slot to a lateral flow of fluids therethrough and enhance cross-flow between adjacent flow channels.

7. The assembly according to claim 1 wherein at least some of said fluid-spreading projections extend downwardly from said sheets.

8. The assembly according to claim 1 wherein at least some of said fluid-spreading projections constitute two segments punched out from a common slot and bent in opposite directions relative to the slot.

9. The assembly according to claim 1 wherein said spacing projections have at least two segments bent relative to each other, all the segments being disposed at a right angle relative to the sheets.

10. The assembly according to claim 9 wherein at least one of said segments is bent away from the associated slot such as to expose said slot to a lateral flow of fluids therethrough.

* * * * *